US008045613B2

(12) United States Patent  
Fann et al.

(10) Patent No.: US 8,045,613 B2
(45) Date of Patent: Oct. 25, 2011

(54) MODULE AND ARCHITECTURE FOR GENERATING REAL-TIME, MULTIPLE-RESOLUTION VIDEO STREAMS AND THE ARCHITECTURE THEREOF

(75) Inventors: Ju Lung Fann, Taipei County (TW); Chun Fu Shen, Taipei County (TW); Shih Yu Hsu, Taipei County (TW)

(73) Assignee: Vivotek Inc, Taipei County (TW)

( * ) Notice: Subject to any disclaimer, the term of this patent is extended or adjusted under 35 U.S.C. 154(b) by 1034 days.

(21) Appl. No.: 11/976,556

(22) Filed: Oct. 25, 2007

(65) Prior Publication Data

US 2008/0282304 A1 Nov. 13, 2008

(30) Foreign Application Priority Data

May 7, 2007 (TW) .............................. 96116046 A

(51) Int. Cl.
*H04N 7/12* (2006.01)
(52) U.S. Cl. .............................. 375/240.01; 375/240.21
(58) Field of Classification Search ........................ None
See application file for complete search history.

(56) References Cited

U.S. PATENT DOCUMENTS

| 6,122,318 | A | * | 9/2000 | Yamaguchi et al. | .......... 375/240 |
| 6,356,589 | B1 | * | 3/2002 | Gebler et al. | .............. 375/240.1 |
| 6,867,714 | B2 | * | 3/2005 | Song et al. | ..................... 341/61 |
| 7,027,507 | B2 | * | 4/2006 | Wu | ........................... 375/240.03 |
| 7,170,932 | B2 | * | 1/2007 | Vetro et al. | .................... 375/240 |
| 2006/0013310 | A1 | * | 1/2006 | Lee et al. | ................. 375/240.16 |
| 2007/0297507 | A1 | * | 12/2007 | Kim | ........................ 375/240.03 |
| 2008/0037628 | A1 | * | 2/2008 | Boyce et al. | ............. 375/240.02 |

* cited by examiner

*Primary Examiner* — Hong Cho
(74) *Attorney, Agent, or Firm* — Birch, Stewart, Kolasch & Birch, LLP

(57) ABSTRACT

A module for generating real-time, multiple-resolution video streams and the architecture thereof are disclosed. A module for generating multiple-resolution video streams as well as the architecture thereof for use with a video encoder includes a system bus, an external memory and a main processor. The main processor and the external memory are coupled to the system bus. The main processor includes a microprocessor, a main arithmetic unit and a secondary arithmetic unit. By applying the present invention, a less time-consuming arithmetic module can synchronously perform together with a more time-consuming arithmetic module, thereby reducing idle time and increasing hardware efficiency and parallelism.

29 Claims, 14 Drawing Sheets

MODULE AND ARCHITECTURE FOR GENERATING REAL-TIME, MULTIPLE-RESOLUTION VIDEO STREAMS AND THE ARCHITECTURE THEREOF

BACKGROUND OF THE INVENTION

1. Field of the Invention

The present invention relates to an image-processing module and the architecture thereof, particularly a module capable of synchronously operating a less time-consuming arithmetic and a more time-consuming arithmetic module, thereby reducing idle time and increasing hardware utilization, and the architecture thereof.

2. Description of the Prior Art

Given wider applicability of video, applications for video gradually increase. Consequently, the processing speed of video becomes very important. Nowadays, the one of widespread technologies for video is the Moving Picture Encoding Group (MPEG). Referring to FIG. 1, a conventional MPEG-4 video-encoding system consists of two parts: a motion estimator and a block encoder. The block encoder includes a motion-difference unit, a discrete cosine transform (DCT), a quantization unit, a variable length code (VLC), an inverse-quantization unit, an inverse discrete cosine transform (inverse DCT) and a motion-compensation unit. Given the motion estimator generates motion vectors, this involves a great number of arithmetic algorithms. It is known that computation of the motion estimator constitutes approximately 60~70% of that of the entire encoding system.

Referring to FIG. 2, a prior art on video processing primarily involves the incorporation of an internal share memory into several functional independent arithmetic modules during video data processing, wherein the main arithmetic unit is taken as the motion estimator, and the secondary arithmetic unit is taken as the block encoder.

Referring to FIG. 3, taking images at a resolution of 704×576 as an example, video streams at respective resolutions of 704×576, 352×288 and 176×144 are generated at a time order of 0~2. FIG. 3 shows that conventional video-processing modules can only process single-resolution data sequentially. In other words, when the main arithmetic unit is processing image data, the secondary arithmetic unit remains idle and the hardware utilization becomes very low. Consequently, when the conventional video-processing module is generating three different resolutions, operating cycles required for operations is $1.31 \times W \times H \times fps \times A$, where W is "width"; H is "height"; fps is "frame per second"; and A is the "operating cycles" of the main arithmetic unit. Referring to FIG. 4, in addition to low utilization of the secondary arithmetic unit, images of the same resolution should be subjected to the sequential operations of the main arithmetic unit and the secondary arithmetic unit before proceeding with the other resolution image processing.

Referring to FIG. 4, if the operating time of the main arithmetic unit is threefold that of the secondary arithmetic unit, the hardware utilization will worsen, thereby causing lower efficiency. The main reasons for low efficiency are:

(1) Given that the original internal share memory is expected to reduce bandwidth between external memory and system bus but the main arithmetic unit and the secondary arithmetic unit use the same share memory, the secondary arithmetic unit is unable to use the share memory concurrently when the main arithmetic unit is using it.

(2) When the main arithmetic unit and the secondary arithmetic unit differ greatly in their operating cycles.

(3) The secondary arithmetic unit must wait for the operating results of the main arithmetic unit before starting the next operation.

Given the above (1) to (3), during overall process period, the main arithmetic unit and the secondary arithmetic unit are sequential process one by one, causing large amount of the idle time.

Referring to FIG. 5, when the video-processing module is processing videos from three different video devices and generating multiple-resolution video streams corresponding to multiple channels, the video-processing module will create considerable idle time, which reduces hardware utilization, wastes resources and lowers data-processing speed.

Conventional architecture causes serious wastage of hardware resources and affects data processing speed. Particularly with the gradual availability of Internet services nowadays, there are different video resolution requirements to accommodate to various demands. For example, a mobile telephone requires a resolution of 176×144; a personal digital assistant (PDA) requires a resolution of 176×144~352×288; a personal computer requires a resolution of 352×288~640×480; and a database requires a resolution of 640×480~1024×768. Given many electronic devices require multiple-channel video data processing and real-time generation of multiple-resolution video streams to be transmitted to a remote end. Unfortunately, the drawbacks inherent in the prior art cause a bottleneck in data processing, making higher service quality impossible.

SUMMARY OF THE INVENTION

The primary object of the present invention is to provide a video-encoding architecture for generating real-time, multiple-resolution video streams from multiple-channel and the module thereof. Given the wide variability of operating times among arithmetic modules, the key to system performance enhancement is:

(1) To achieve parallel processing between arithmetic modules;

(2) To increase the utilization and reduce the idle time of a less time-consuming arithmetic unit during overall operation period, under the system specification designated for real-time, multiple-channel, multiple-resolution video streaming;

(3) To reduce the use of a more time-consuming arithmetic unit under the specification designated for real-time, multiple-channel, multiple-resolution video streaming so as to reduce overall system operating time and power consumption; and (4) To balance the operating times among different modules.

By achieving the independent module parallelism via an external memory, the present invention enables the less time-consuming arithmetic module to perform multiple synchronous operations while the more time-consuming arithmetic module is performing operations, in order to reduce hardware idle time and achieve equilibrium in operating times of modules and overall performance enhancement. Moreover, by using video-encoding operations, the count of operations for the more time-consuming arithmetic module is reduced in order to provide multiple real-time video streams. Moreover, the present invention can process multiple-channel video sources and transmit multiple-resolution video bitstreams in real time to a remote receiver via a network system.

To achieve the above objects, the present invention provides a module for generating real-time, multiple-resolution video streams applicable for a video encoder. The module includes a system bus, an external memory and a main processor, wherein the main processor and the external memory are coupled to the system bus. The main processor includes a microprocessor, a main arithmetic unit and a secondary arithmetic unit. The microprocessor, the main arithmetic unit and the secondary arithmetic unit are coupled to the system bus for data transmission, wherein, when processing n video data, the module performs a parallel operation process, including the steps:

(a) Sampling the nth video data down by m times to generate corresponding k down-sampled video data, where m is a positive real number and k is a positive integer, and m and k have one-to-one relationship;

(b) Outputting any down-sampled video data of the nth video data by the external memory to the main arithmetic unit to generate D(n) data, which is stored in the external memory, wherein D(n) is the nth video data, where n is an integer greater than zero;

(c) After the module has performed the information refining process, the external memory inputs the nth video data and a target data corresponding to the data D(n) to the secondary arithmetic unit so as to process corresponding data, and then subjects the n−1th video data to Steps (a) and (b) correspondingly in real time; and (d) By repeating the data D(n), the remaining k−1 down-sampled video data obtain their corresponding target data. By using the nth video data and the target data, the secondary arithmetic unit 708 performs its corresponding data operations so as to generate k−1 resolution video streams, which are stored in the external memory. The module then subjects the n−1th video data to Steps (c) and (d) correspondingly in real time.

Via the Steps (a)~(d), n video data generates corresponding multiple-resolution video streams in real time.

To achieve the above objects, the present invention provides an architecture for generating real-time, multiple-resolution video streams for synchronous processing of multiple-channel video data. The architecture includes a plurality of video devices, a video-processing module, a first network server, a second network server, and a plurality of receivers, wherein the plurality of video devices capture n video data. The video-processing module is coupled to the video devices, wherein the video-processing module inputs n video data to perform a parallel operation process in order to output the multiple-resolution video streams corresponding to each video data in real time. The video-processing module subjects the module for generating real-time, multiple-resolution video streams to the parallel operation process. The fist network server is coupled to the video-processing module and a network system, and via a first communication protocol, outputs the video streams to the network system after inputting video data. The second network server is coupled to the network system and a plurality of receivers, and via a second communication protocol, inputs the multiple-resolution video streams. Moreover, the second network server outputs corresponding video streams to individual receivers.

According to a preferred embodiment of the present invention, m is 1, ¼ or ¹⁄₁₆.

According to another preferred embodiment of the present invention, the information refining process is: if m=1, the data D(n) is reduced into the target data by 1/Q times in order to perform Steps (c)~(d) correspondingly, where Q is a positive integer. By continuously changing Q values and performing corresponding operations using the secondary arithmetic unit, multiple real-time, multiple-resolution video streams are obtained.

According to another preferred embodiment of the present invention, the information refining process is: if m=1/P, the data D(n) is increased into the target data by Q times in order to perform Steps (c)~(d) correspondingly, where P and Q are positive integers. By continuously changing Q values and performing corresponding operations using the secondary arithmetic unit, real-time, multiple-resolution video streams are obtained.

According to another preferred embodiment of the present invention, the information refining process is: if m=1/P, the data D(n) is reduced into the target data by 1/Q times in order to perform the corresponding steps, where P and Q are positive integers. By continuously changing Q values and performing corresponding operations using the secondary arithmetic unit, real-time, multiple-resolution video streams are obtained.

According to another preferred embodiment of the present invention, the data D(n) is a motion vector data.

According to another preferred embodiment of the present invention, the time required for the main arithmetic unit to process the nth video data is longer than that of the secondary arithmetic unit by y times, where 1<y<10.

According to another preferred embodiment of the present invention, the main arithmetic unit is a motion estimator for motion estimation.

According to another preferred embodiment of the present invention, the secondary arithmetic unit is a block-encoding unit, which includes a motion-difference unit, a discrete cosine transform (DCT), a quantization unit, a variable length code (VLC), an inverse-quantization unit, an inverse discrete cosine transform (inverse DCT) and a motion-compensation unit.

According to another preferred embodiment of the present invention, the module further includes a video-capture unit, which is coupled to at least one video device for image capture.

According to another preferred embodiment of the present invention, the module further includes a network-bridging unit for connecting to a network server.

According to another preferred embodiment of the present invention, the receiver is a personal computer, a database, a PDA or a mobile phone.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 6:
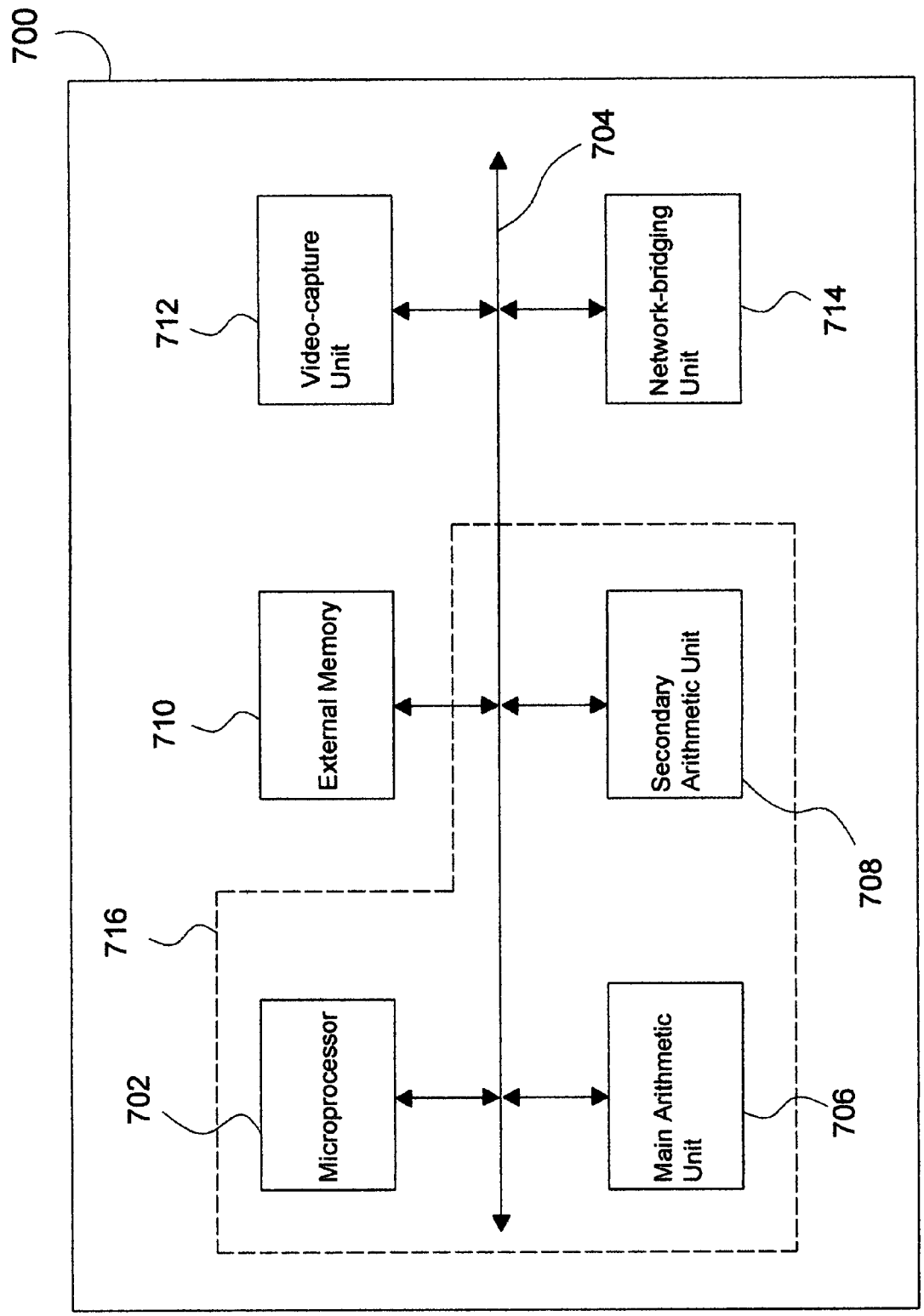
FIG. 6 is a circuit functional block diagram illustrating a module for generating real-time, multiple-resolution video streams made according to a preferred embodiment of the present invention.

Referring to FIG. 6, the module for generating real-time, multiple-resolution video streams 700 includes a microprocessor 702, a system bus 704, a main arithmetic unit 706, a secondary arithmetic unit 708, an external memory 710, a video-capture unit 712 and a network-bridging unit 714, wherein the microprocessor 702, the main arithmetic unit 706, the secondary arithmetic unit 708, the external memory 710, the video-capture unit 712, and the network-bridging unit 714 are coupled to the system bus 704. The video-capture unit 712 captures video data, whereas the network-bridging unit 714 is connected to at least a network server. The main arithmetic unit 716 includes the microprocessor 702, the main arithmetic unit 706 and the secondary arithmetic unit 708. The external memory 710 is formed on an exterior of the main arithmetic unit 716.

Figure 1:
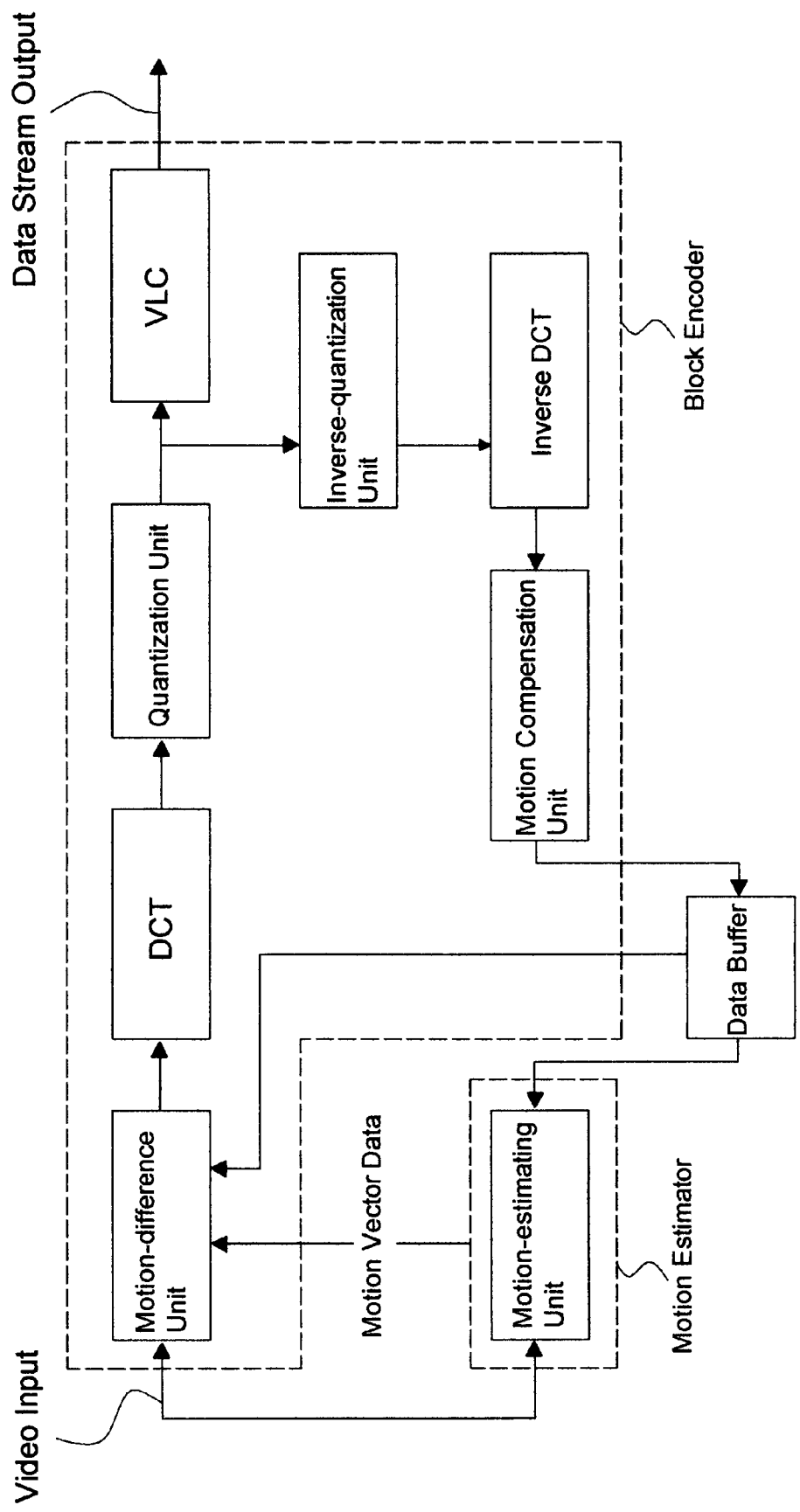
FIG. 1 is a functional block diagram of a conventional video-encoding system coded in MPEG-4.
Figure 2:
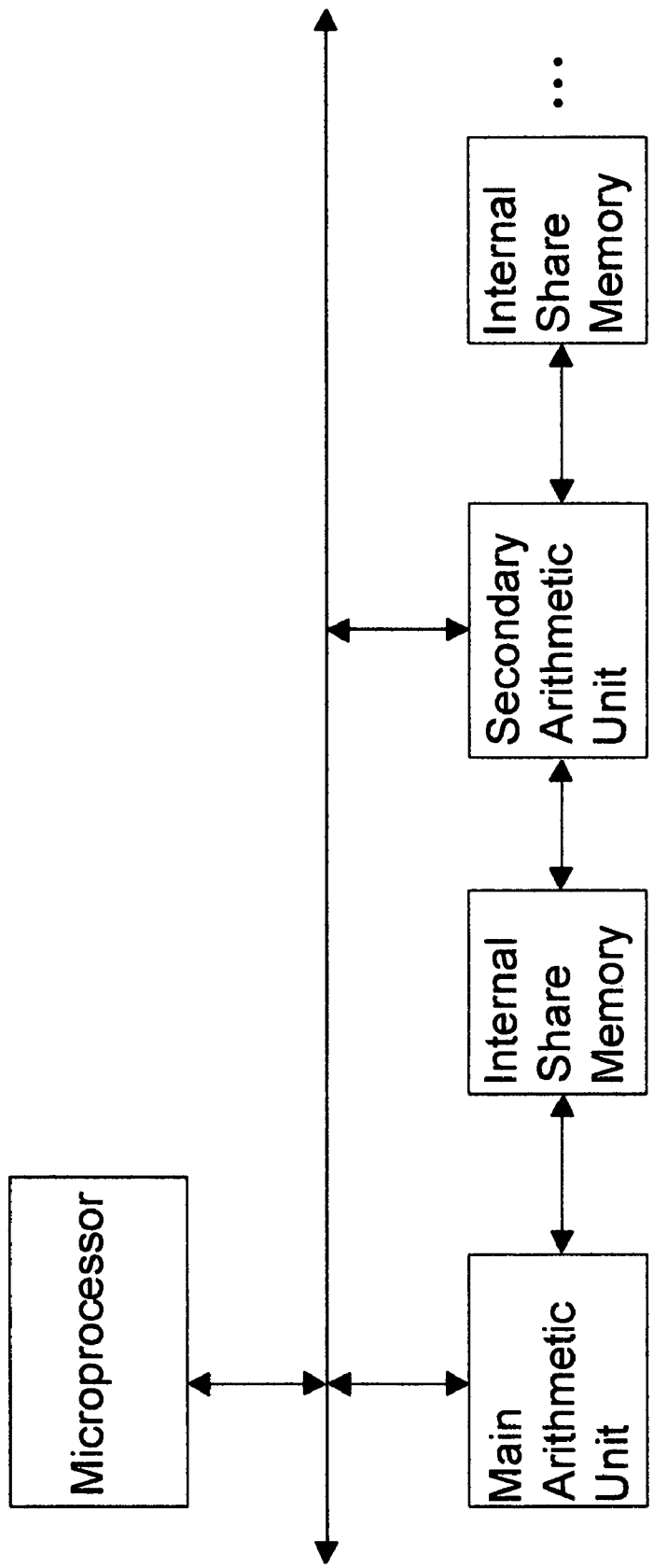
FIG. 2 is a functional block diagram of a conventional video-processing module.

Referring to FIG. 1, the main arithmetic unit 706 is a motion estimator for motion estimation. The secondary arithmetic unit 708 is a block-encoding unit, which includes a motion-difference unit, a discrete cosine transform (DCT), a quantization unit, a variable length code (VLC), an inverse-quantization unit, an inverse discrete cosine transform (inverse DCT) and a motion-compensation unit, wherein the motion-difference unit is coupled to the main arithmetic unit 706. The discrete cosine transform (DCT) is coupled to the motion-difference unit, while the quantization unit is coupled to the discrete cosine transform (DCT). The variable length code (VLC) is coupled to the quantization unit, while the inverse-quantization unit is coupled to the variable length code (VLC) and the quantization unit. The inverse discrete cosine transform (inverse DCT) is coupled to the inverse-quantization unit, while the motion-compensation unit is coupled to the inverse discrete cosine transform (inverse DCT). The hardware architecture for the motion estimator unit and the block-encoding unit is similar to FIG. 1. Therefore, the prior art disclosed therein shall not be specified again here.

When processing n video data (plurality), the module 700 performs a parallel operation process, including the steps:
  (a) Sampling the nth video data down by m times to generate corresponding k down-sampled video data, where m is a positive real number and k is a positive integer, and m and k have one-to-one correspondence;
  (b) Outputting any down-sampled video data of the nth video data by the external memory to the main arithmetic unit to generate D(n) data, which is stored in the external memory, wherein D(n) is the nth video data, where n is an integer greater than zero;
  (c) After the module 700 has performed the information refining process, the external memory 710 inputs the nth video data and a target data corresponding to the data D(n) to the secondary arithmetic unit 708 so as to process corresponding data and obtain the first-resolution video stream. The module 700 causes the n−1th video data to perform Steps (a) and (b) correspondingly in real time; and
  (d) Via the data D(n), causing the remaining k−1 down-sampled video data to perform the corresponding Step (c). The secondary arithmetic unit generates the k−1 resolution video streams, which are stored in the external memory 710 by the module 700. The module 700 then instantly causes the n−1th video data to perform corresponding Steps (c) and (d).

For example, when the module 700 is coupled to a plurality of video devices (not shown in the drawing), the video devices output corresponding video data to the module 700 within a specific time internal. When processing n video data, the module 700 performs a parallel operation process, including the steps:
  (a) Through the operations of the microprocessor 702 and the external memory 710, the module 700 samples the nth video data down by m times to generate corresponding k down-sampled video data, where m is a real number, and m is preferably 1, ¼ or ¹⁄₁₆ for the present embodiment;
  (b) The external memory 710 outputs any down-sampled video data of the k down-sampled video data to the main arithmetic unit 706 to generate D(n) data, which is inputted into the external memory 710 by the main arithmetic unit 706, wherein D(n) is the nth video data, where n is a positive integer, and D(n) is a motion vector data in the present embodiment;
  (c) After the module 700 has performed the information refining process using the microprocessor 702 and the external memory 710, the external memory 710 inputs the nth video data and a target data corresponding to the data D(n) to the secondary arithmetic unit 708 so as to process corresponding data and obtain the first-resolution video stream. The module 700 causes the n−1th video data to perform Steps (a) and (b) correspondingly in real time. In other words, when the main arithmetic unit 706 processes the first video data, the operational results, which are magnified or shrunk into target data by the main arithmetic unit 700, are stored in the external memory 710. The first video data and the target data are inputted to the secondary arithmetic unit 708 to perform corresponding operations. The second video data is inputted into the main arithmetic unit 706 for real-time operations, such that the main arithmetic unit 706 and the secondary arithmetic unit 708 synchronously process data, thereby reducing the idle time and achieving parallel processing; and (d) By repeating the data D(n), obtain respective target data for the remaining k−1 down-sampled video data. Via the nth video data and the target data, the secondary arithmetic unit 708 performs corresponding data operations to generate the k−1-resolution video streams, which are stored in the external memory 710 by the module 700. The module 700 then subjects the n−1th video data to Steps (c) and (d) correspondingly in real time. In other words, given the main arithmetic unit 706 requires y times more time for processing the nth video data than that required by the secondary arithmetic unit 708, where 1<y<10. Consequently, when the second video data is performing operations of the main arithmetic unit 706, the first video data has sufficient time for the operations of the secondary arithmetic unit 708. By repeating corresponding algorithms several times, multiple-resolution video streams corresponding to the first video data are generated, thereby greatly reducing the system idle time and completing parallel processing. Via the Steps (a)~(d), multiple-resolution video streams corresponding to n video data are generated in real time.

Figure 7:
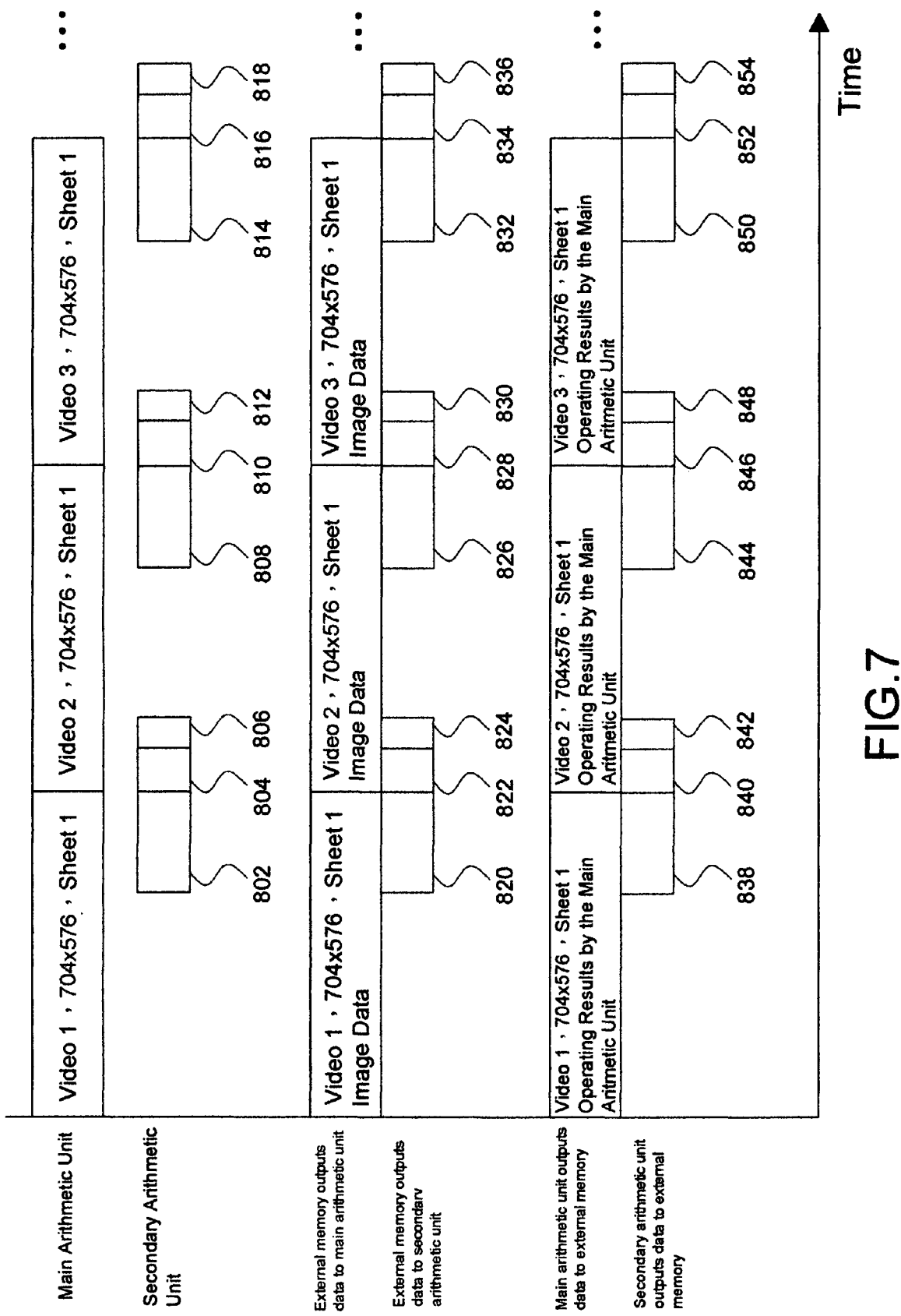
FIG. 7 illustrates the parallel operation process of multiple-channel and multiple-resolution video data for a main arithmetic unit and a secondary arithmetic unit, and an external memory access timing diagram made according to a preferred embodiment of the present invention.

Referring to FIG. 7, "802" denotes video 1 at a resolution of 704×576 for sheet 1; "804" denotes video 1 at a resolution of 352×288 for sheet 1; and "806" denotes video 1 at a resolution of 176×144 for sheet 1. "808" denotes video 2 at a resolution of 704×576 for sheet 1; "810" denotes video 2 at a resolution of 352×288 for sheet 1; and "812" denotes video 2 at a resolution of 176×144 for sheet 1. "814" denotes video 3 at a resolution of 704×576 for sheet 1; "816" denotes video 3 at a resolution of 352×288 for sheet 1; and "818" denotes video 3 at a resolution of 176×144 for sheet 1. "820" denotes sheet 1 image data for video 1 at a resolution of 704×576; "822" denotes sheet 1 image data for video 1 at a resolution of 352×288; and "824" denotes sheet 1 image data for video 1 at a resolution of 176×144. "826" denotes sheet 1 image data for video 2 at a resolution of 704×576; "828" denotes sheet 1 image data for video 2 at a resolution of 352×288; and "830" denotes sheet 1 image data for video 2 at a resolution of 176×144. "832" denotes sheet 1 image data for video 3 at a resolution of 704×576; "834" denotes sheet 1 image data for video 3 at a resolution of 352×288; and "836" denotes sheet 1 image data for video 3 at a resolution of 176×144. "838" denotes sheet 1 operating results by the secondary arithmetic unit for video 1 at a resolution of 704×576; "840" denotes sheet 1 operating results by the secondary arithmetic unit for video 1 at a resolution of 352×288; and "842" denotes sheet 1 operating results by the secondary arithmetic unit for video 1 at a resolution of 176×144. "844" denotes sheet 1 operating results by the secondary arithmetic unit for video 2 at a resolution of 704×576; "846" denotes sheet 1 operating results by the secondary arithmetic unit for video 2 at a resolution of 352×288; and "848" denotes sheet 1 operating results by the secondary arithmetic unit for video 2 at a resolution of 176×144. "850" denotes sheet 1 operating results by the secondary arithmetic unit for video 3 at a resolution of 704×576; "852" denotes sheet 1 operating results by the secondary arithmetic unit for video 3 at a resolution of 352×288; and "854" denotes sheet 1 operating results by the secondary arithmetic unit for video 3 at a resolution of 176×144.

Referring to FIG. 7, if multiple video data are synchronously inputted into the module 700, the previous video data has sufficient time for the operations of the secondary arithmetic unit 708 due to great differences in operating times, when the subsequent video data performs the operations of the main arithmetic unit 706. Based on the operating results of the main arithmetic unit 706, the information refining process is started. The secondary arithmetic unit 708 performs multiple operations to generate multiple-resolution video streams. Therefore, the secondary arithmetic unit 708 can use the vacant time interval to complete the operations of the main arithmetic unit 706, such as performing multiple corresponding operations and the number of operations of the secondary arithmetic unit 708 suitable for the operating time of the main arithmetic unit 706. This can greatly increase the usage of the secondary arithmetic unit and the quantity of multiple-resolution video streams.

Via the operations of the microprocessor 702 and the external memory 710, the information refining process operates depending on the values of m:

(1) if m=1, the module 700 reduces data D(n) into the target data by 1/Q times in order to perform Steps (c)~(d) correspondingly, where Q is a positive integer. By continuously changing Q values and performing corresponding operations using the secondary arithmetic unit, multiple real-time, multiple-resolution video streams are obtained. In other words, if the module 700 makes no changes to the size of raw video data, the motion vectors of the video data are reduced in size, and then transmitted to the secondary arithmetic unit 708 in order to obtain lower-resolution video streams.

(2) if m=1/P, the module 700 increases data D(n) into the target data by Q times in order to perform Steps (c)~(d) correspondingly, where P and Q are positive integers. By continuously changing Q values and performing corresponding operations using the secondary arithmetic unit, real-time, multiple-resolution video streams are obtained. In other words, if the module 700 reduces the size of raw video data, the motion vectors of the video data are increased in size, and then transmitted to the secondary arithmetic unit 708 in order to obtain higher-resolution video streams.

(3) if m=1/P, the module 700 reduces data D(n) into the target data by 1/Q times in order to perform steps (c)~(d) correspondingly, where P and Q are positive integers. By continuously changing Q values and performing corresponding operations using the secondary arithmetic unit, multiple-resolution video streams are obtained. In other words, if the module 700 reduces the size of raw video data, the motion vectors of the video data are further reduced in size, and then transmitted to the secondary arithmetic unit 708 in order to obtain even lower-resolution video streams.

Figure 8:
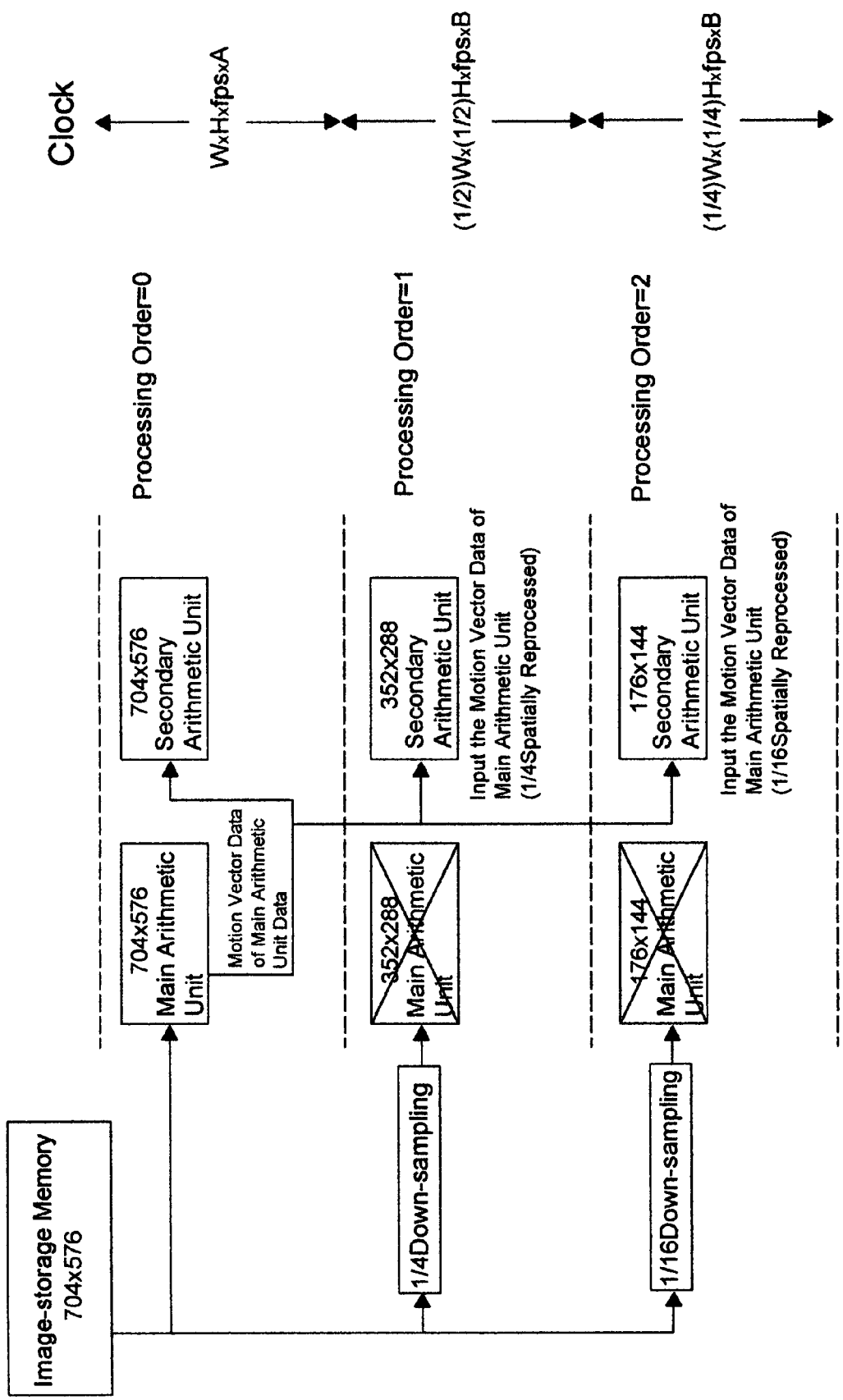
FIG. 8 illustrates the operations of the information refining process made according to a preferred embodiment of the present invention.
Figure 9:
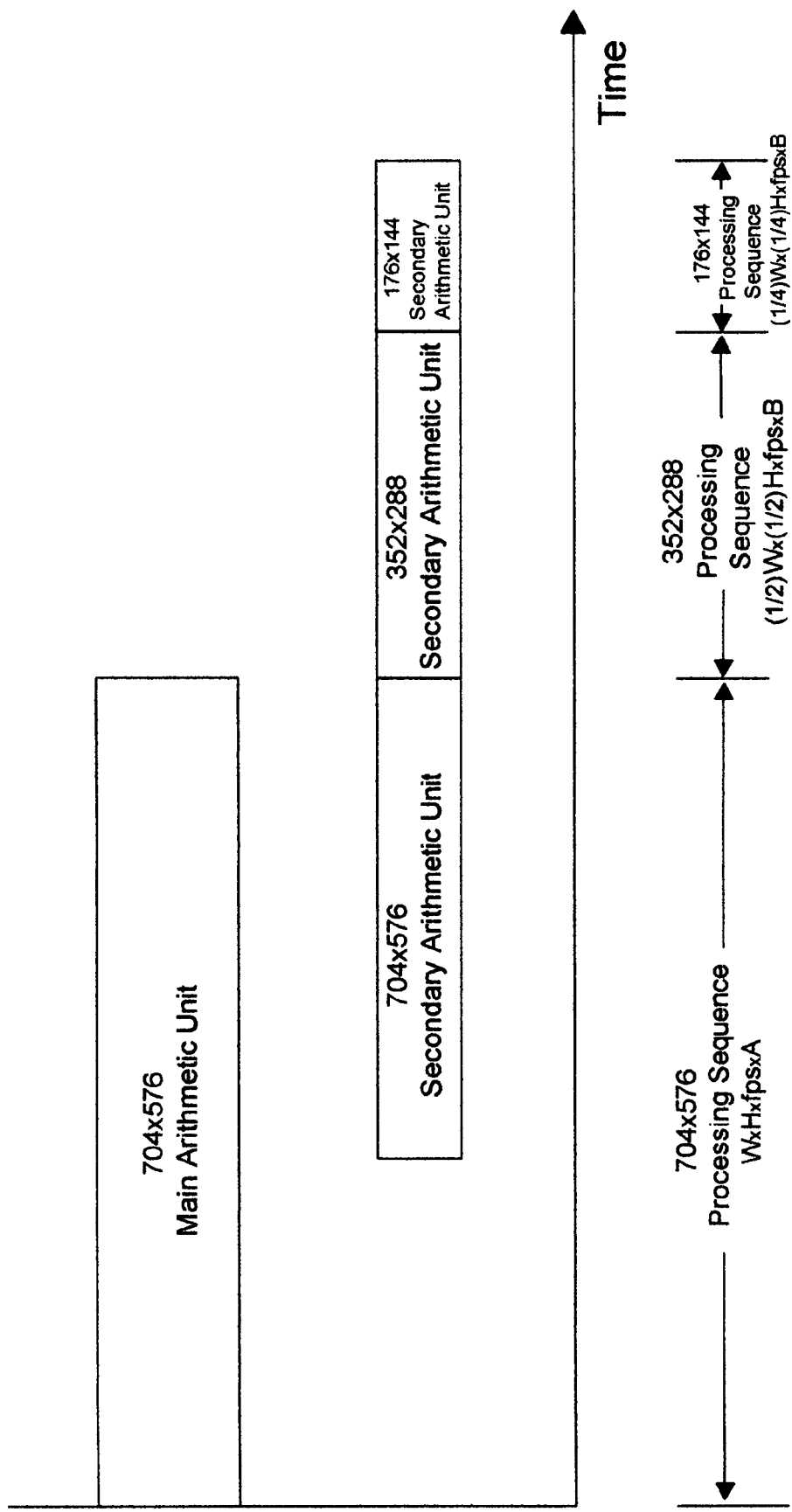
FIG. 9 illustrates the timing diagram of the information refining process made according to a preferred embodiment of the present invention.

Referring to FIG. 8, taking images at a resolution of 704×576 as an example, video streams at a resolution of 704×576, 352×288 and 176×144 respectively are generated at a processing order of 0~2. When the processing order is 0 and m=1, D(n) becomes unchanged, and original-resolution video streams are outputted. When the processing order is 1 and m=1, D(n) is reduced by ¼, and video streams at ¼ resolution is outputted. When the processing order is 2 and m=1, D(n) is reduced by ¹⁄₁₆, and video streams at ¹⁄₁₆ resolution is outputted. FIG. 9 marks operation cycles required for each processing order. Given less ¾ operating time is required for the main arithmetic unit when m=¼ than that when m=1, operation cycles required is reduced to 1.16×W×H×fps×A from 1.31×W×H×fps×A compared with FIG. 3, where W is "image width"; H is "image height"; fps is the number of frames per second; A is operation cycles of the main arithmetic unit; and B is operation cycles of the secondary arithmetic unit. In this embodiment, it is assumed that operation cycle of the main arithmetic unit is twice that of the secondary arithmetic unit.

Figure 10:
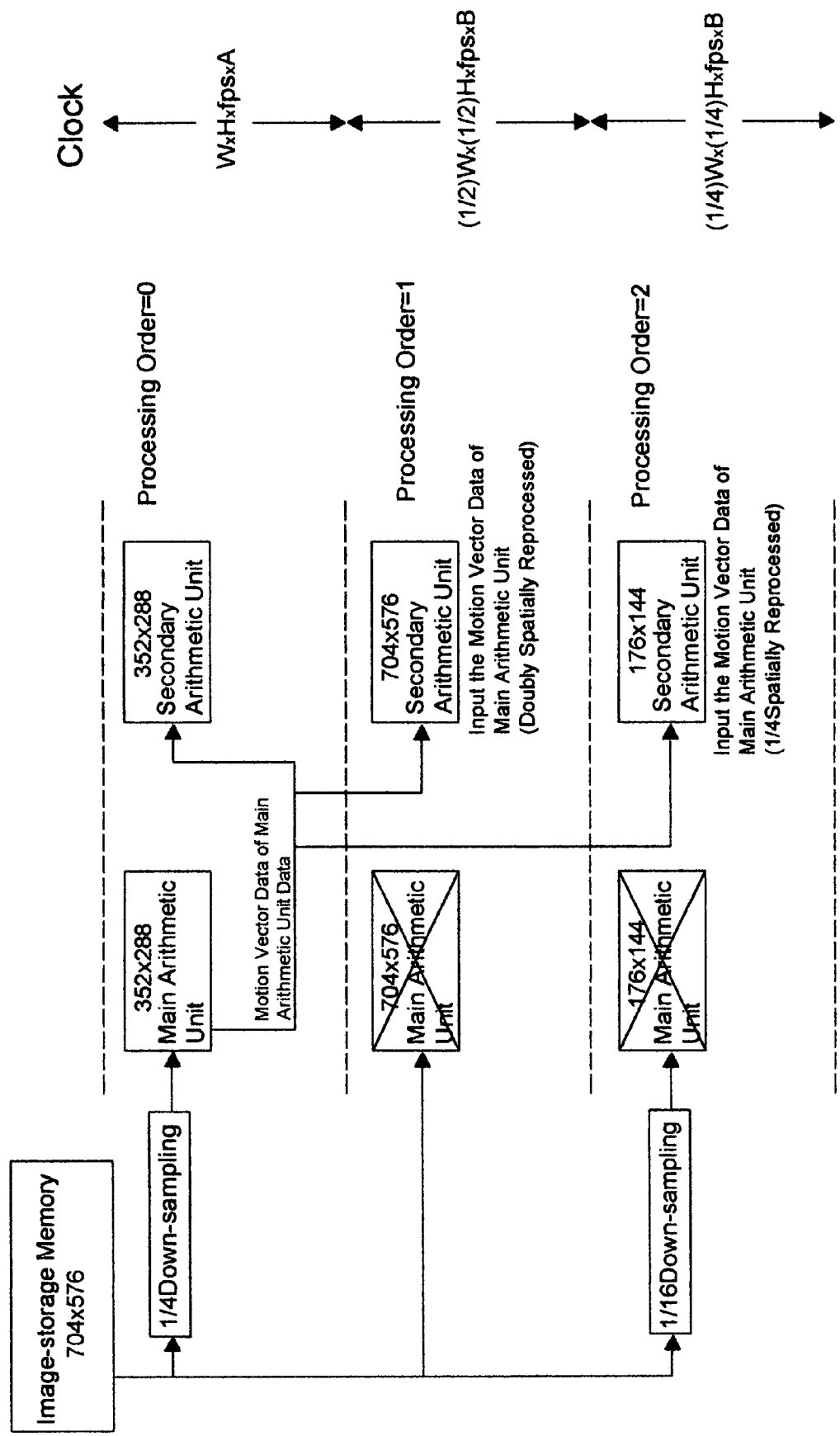
FIG. 10 illustrates the operations of the information refining process made according to a preferred embodiment of the present invention.
Figure 11:
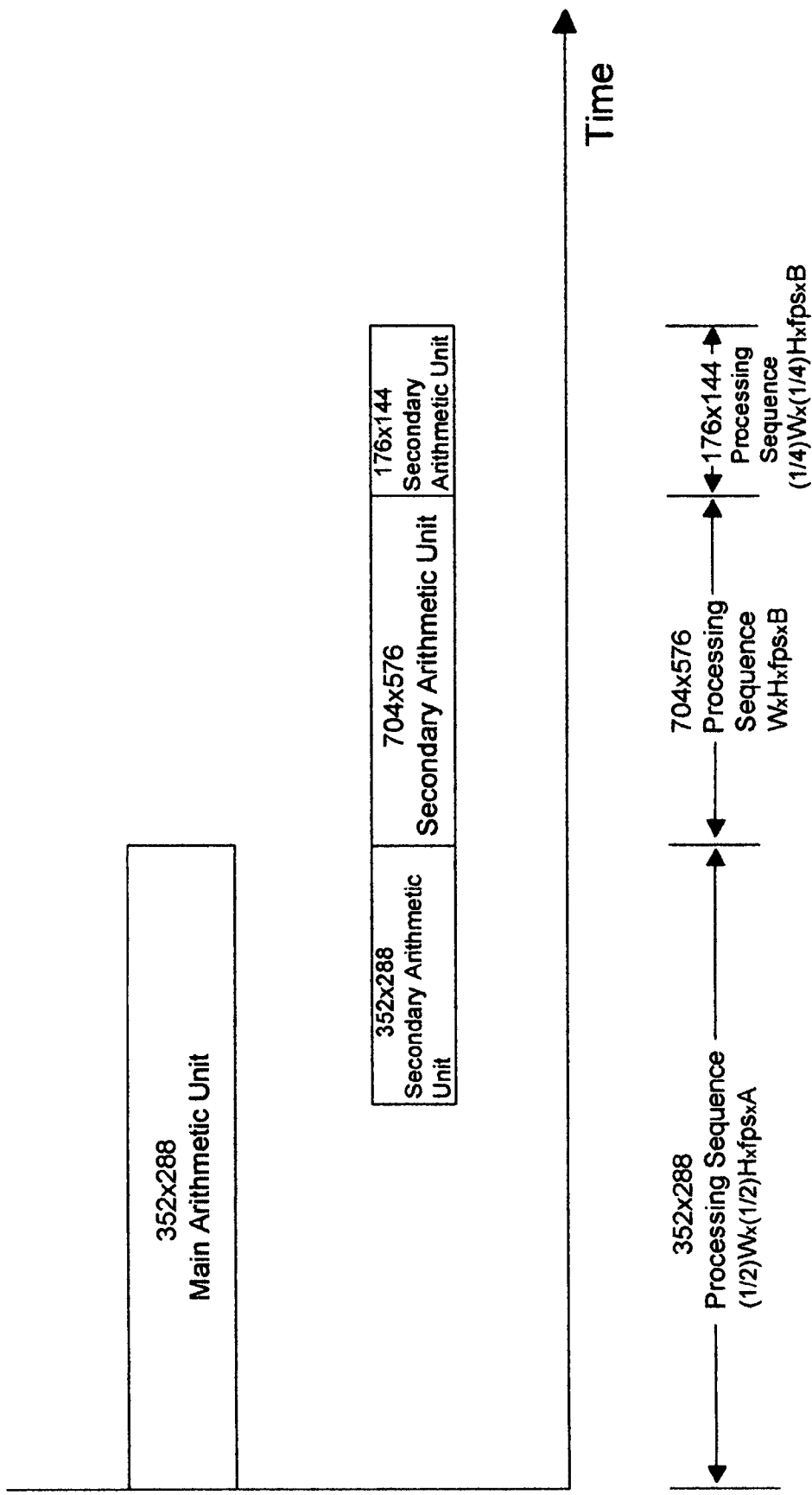
FIG. 11 illustrates the timing diagram of the information refining process made according to a preferred embodiment of the present invention.

Referring to FIG. 10, taking images at a resolution of 704×576 as an example, video streams at a resolution of 704×576, 352×288 and 176×144 respectively are generated at a processing order of 0~2. When the processing order is 0 and m=¼, D(n) becomes unchanged, and ¼-resolution video streams are outputted. When the processing order is 1 and m=1, D(n) is increased by fourfold, and original resolution video streams are outputted. When the processing order is 2 and m=1/16, D(n) is reduced by ¼, and 1/16-resolution video streams are outputted. FIG. 11 marks operation cycles required for each processing order. Operation cycles required is reduced from 1.16×W×H×fps×A to 0.78×W×H×fps×A, compared with FIG. 8, where W is image width; H is image height; fps is the number of frames per second; A is operation cycles of the main arithmetic unit; and B is operation cycles of the secondary arithmetic unit. In this embodiment, it is assumed that operation cycle of the main arithmetic unit is twice that of the secondary arithmetic unit.

Taking images at a resolution of 704×576 as an example, video streams at a resolution of 704×576, 352×288 and 176×144 respectively are generated at a processing order of 0~2. When the processing order is 0 and m=1/16, D(n) becomes unchanged, and 1/16-resolution video streams are outputted. When the processing order is 1 and m=1, D(n) is increased by 16 times, and original-resolution video streams are outputted. When the processing order is 2 and m=¼, D(n) is increased by fourfold, and ¼-resolution video streams are outputted.

Figure 12:
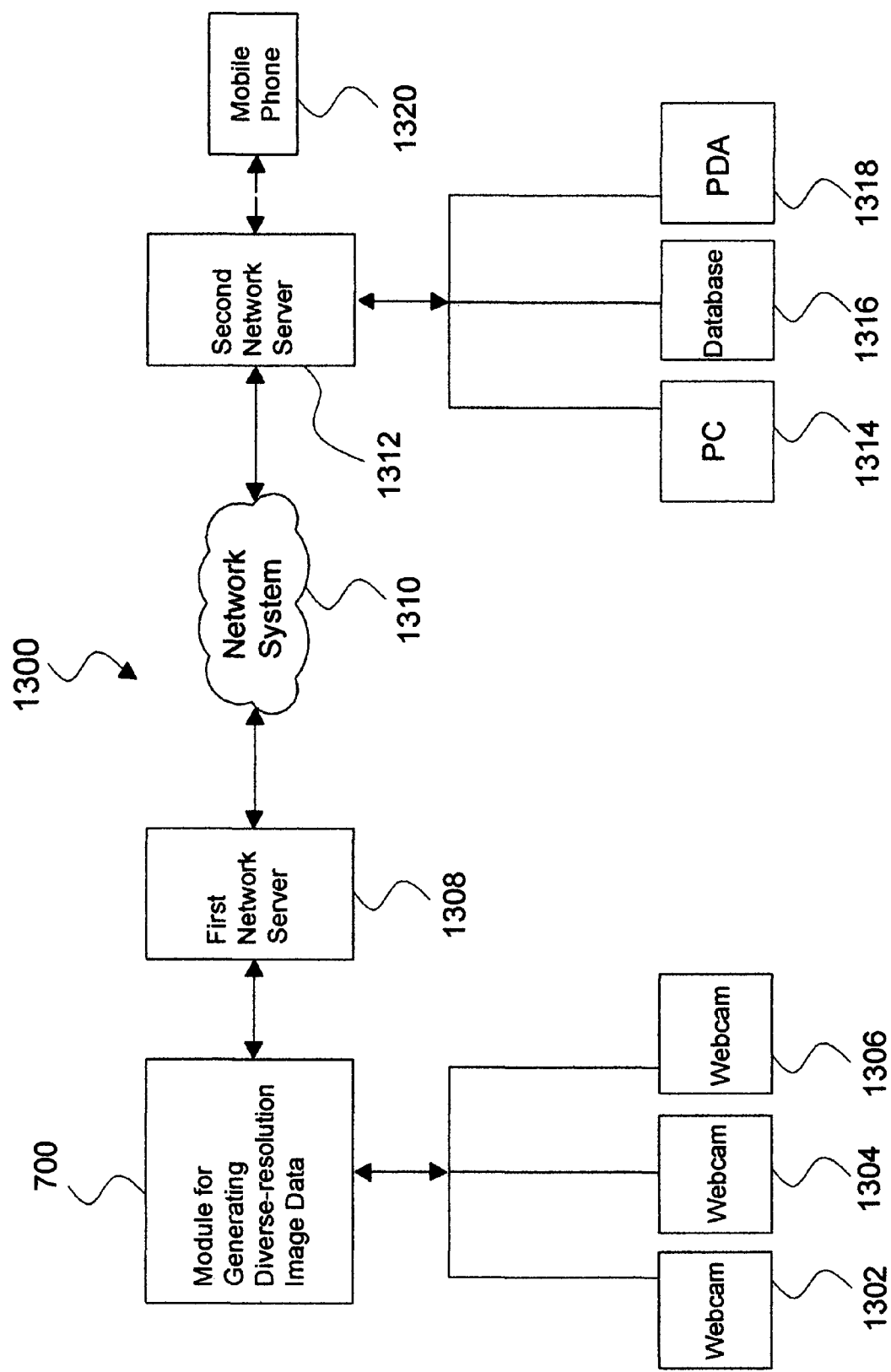
FIG. 12 illustrates the architecture for generating real-time, multiple-resolution video streams made according to a preferred embodiment of the present invention.

Referring to FIG. 12, the architecture for generating real-time, multiple-resolution video streams 1300 includes a module for generating real-time, multiple-resolution video data 700, a webcam 1302, a webcam 1304, a webcam 1306, a first network server 1308, a network system 1310, a second network server 1312, a personal computer 1314, a database 1316, a PDA 1318, and a mobile phone 1320, wherein the module 700 for generating real-time, multiple-resolution video streams is coupled to the webcam 1302, the webcam 1304, the webcam 1306 and the first network server 1308. The first network server 1308 and the second network server 1312 are coupled to the network system 1310. The second network server 1312 is coupled to the personal computer 1314, the database 1316, the PDA 1318 ad the mobile phone 1320.

The module 700 for generating real-time, multiple-resolution video streams is a video-processing module. The architecture and operations of the video-processing module is the same as those shown in FIG. 6 and will thus not be further illustrated herein. The video-processing module is coupled to a plurality of video devices, which are webcams in the present embodiment. The video-processing module inputs n video data from the video devices to form a multiple-channel input. The module 700 for generating real-time, multiple-resolution video streams performs a parallel operation process for outputting multiple-resolution video streams corresponding to each video data in real time. In this embodiment, the personal computer 1314, the database 1316, the PDA 1318 and the mobile phone 1320 receive multiple-resolution video streams transmitted from the webcam 1302, the webcam 1304 and the webcam 1306.

Figure 13:
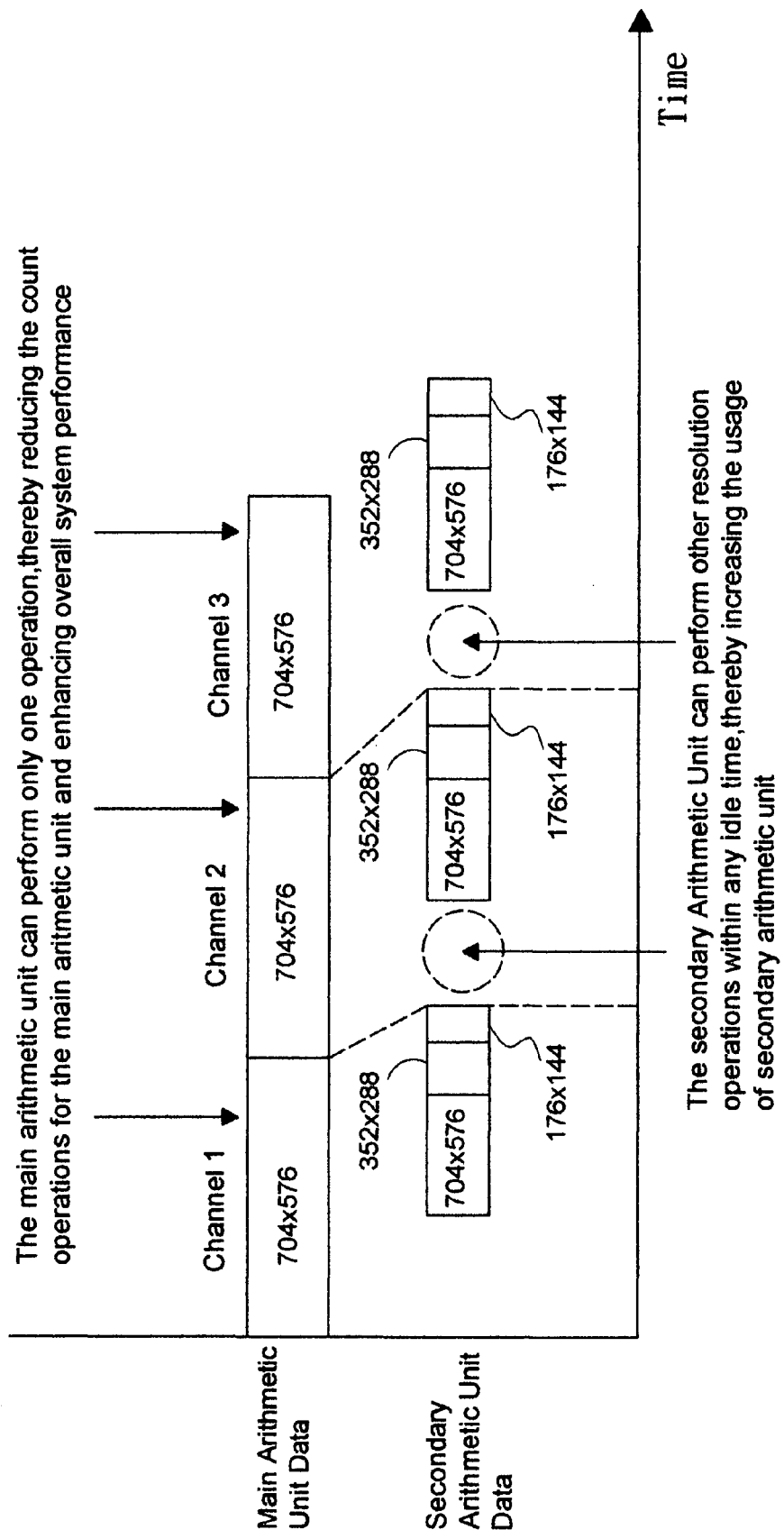
FIG. 13 illustrates the timing diagram for generating real-time, multiple-channel and multiple-resolution video streams made according to a preferred embodiment of the present invention.

Referring to FIG. 13, taking the individual processing of 704×576-resolution images using three channels as an example, real-time video streams at a respective resolution of 704×576, 352×288 and 176×144 are generated. This figure indicates that more operations can be made on the further more resolution of video streams at any time when the secondary arithmetic unit remains idle, thereby greatly increasing hardware usage efficiency.

Figure 3:
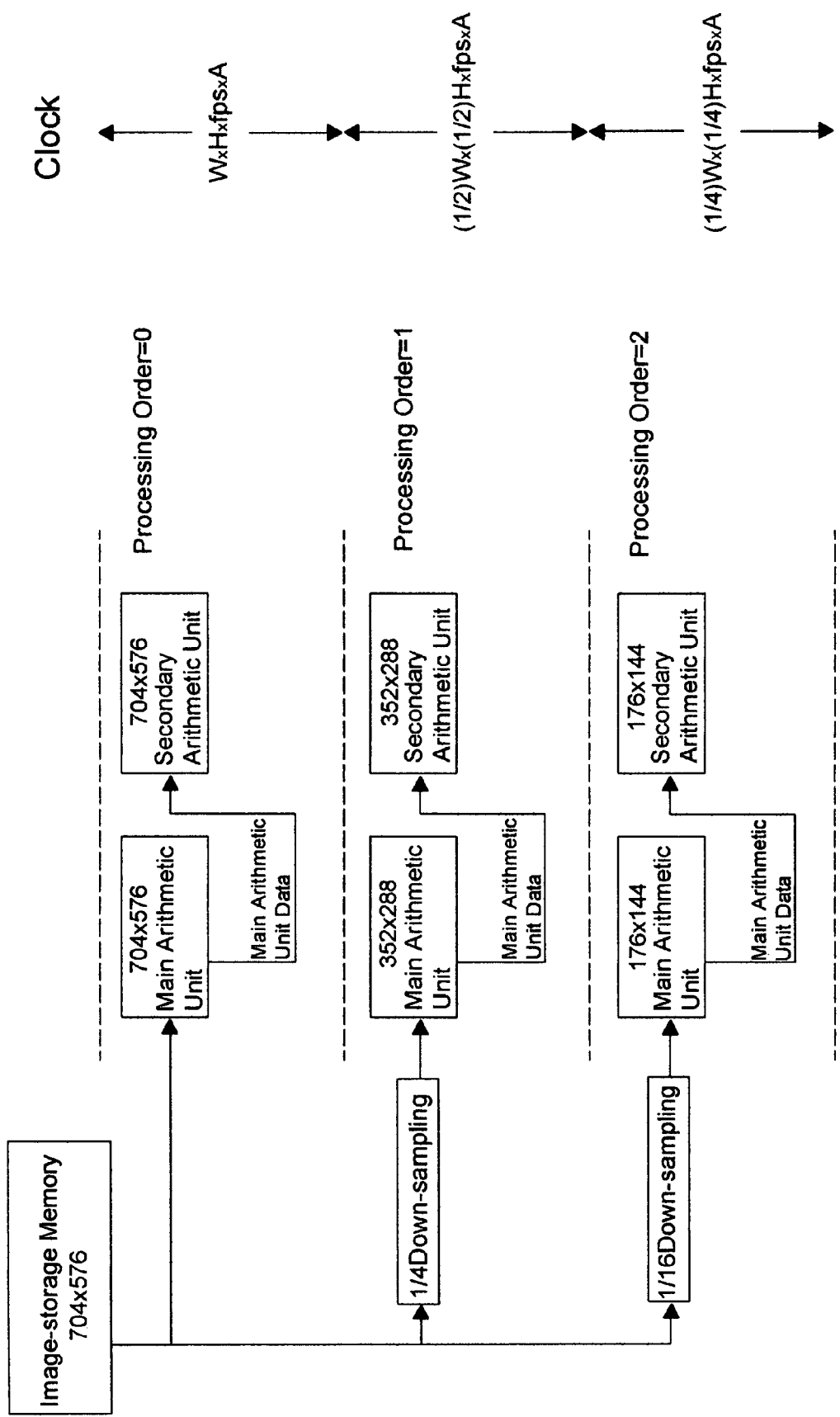
FIG. 3 illustrates multiple-resolution operations and processing order in a conventional video-processing module.
Figure 4:
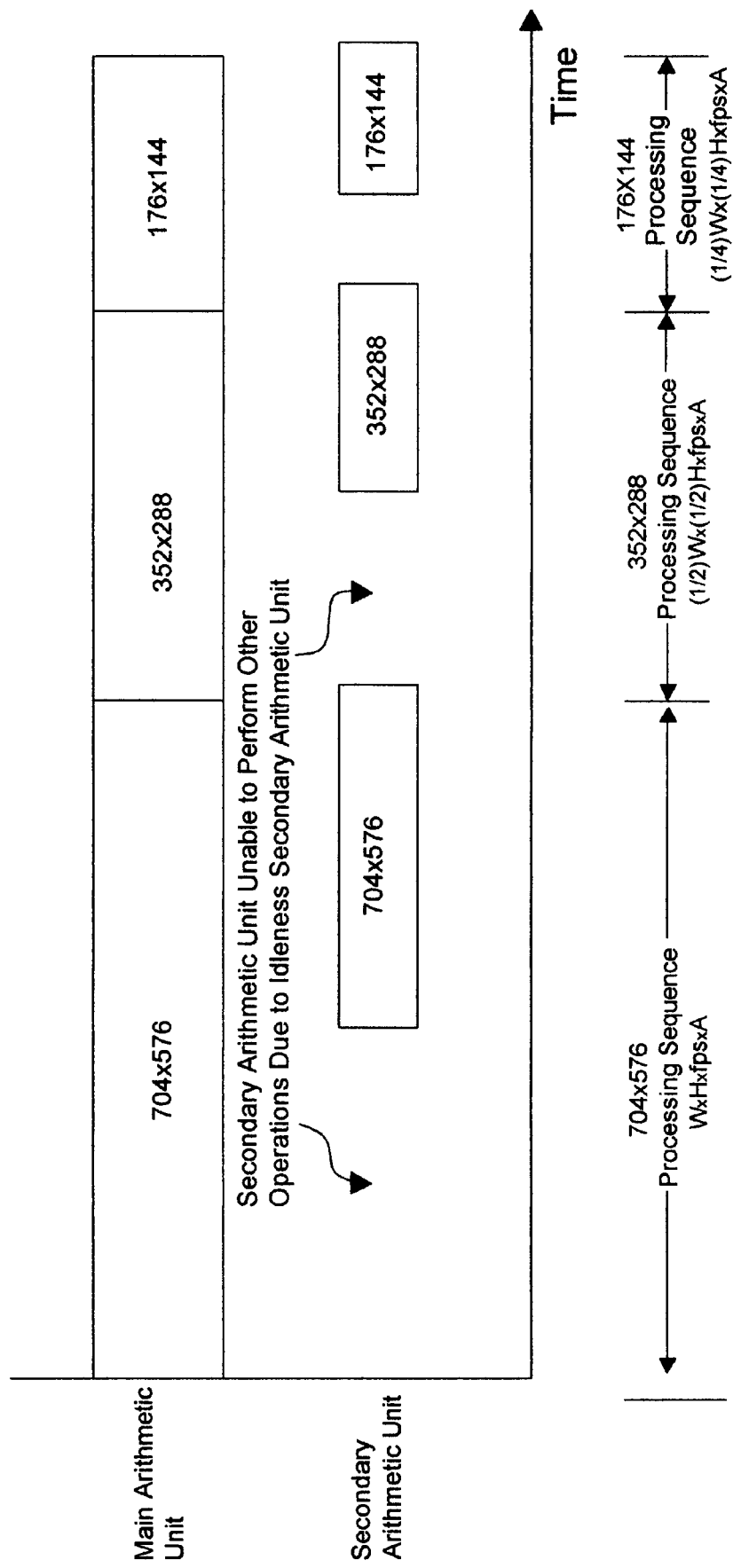
FIG. 4 illustrates the multiple-resolution timing diagram of a conventional video-processing module.
Figure 5:
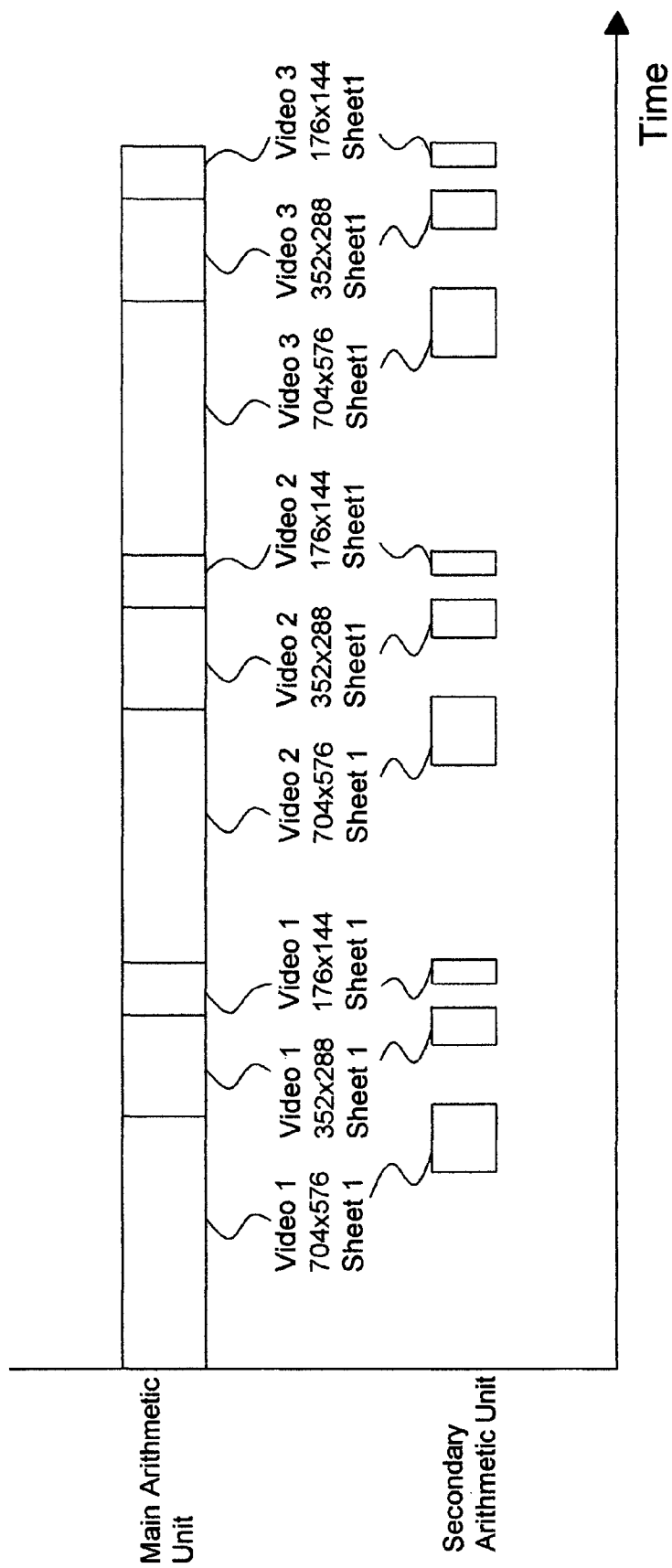
FIG. 5 illustrates a conventional video-processing module's timing diagram of processing multiple-channel, multiple-resolution video streams.

Referring to FIGS. 3, 8 and 10, if A=2B, operation cycles required for the operational model shown in FIGS. 3, 9 and 11 is:

(1) The total clock required for the model shown in FIG. 3=1.31×W×H×fps×A;
(2) The total clock required for the model shown in FIG. 8=W×H×fps×A+W×H×fps×0.31B=1.16×W×H×fps×A; and
(3) The total clock required for the model shown in FIG. 10=W×H×fps×0.25A+W×H×fps×1.06B=0.78×W×H×fps×A.

The above analysis indicates that the operating speed achieved by the model shown in FIG. 8 and FIG. 10 is respectively 11% and 40.45% higher than that achieved by the prior art. This reflects that the increase is very significant and the improvement is very high.

Referring to FIGS. 14, 8~11, when the main arithmetic unit and the secondary arithmetic unit differ two or three times in their performance, the motion vectors of 176×144-resolution image data are increased into target data in order to generate multiple-resolution video streams. Therefore, If A=2B, the total clock required for the model indicated in FIG. 10 is: (¼)W×(¼)H×fps×A+W×H×fps×B+(½)W×(½)H×fps×B=0.69W×H×fps×A;

If A=3B, the total clock required for the model indicated in FIG. 10 is: (¼)W×(¼)H×fps×A+W×H×fps×B+(½)W×(½)H×fps×B=0.46W×H×fps×A; Increase rate of operating speed=(1−0.46/1.31)×100%=64.88%.

Figure 14:
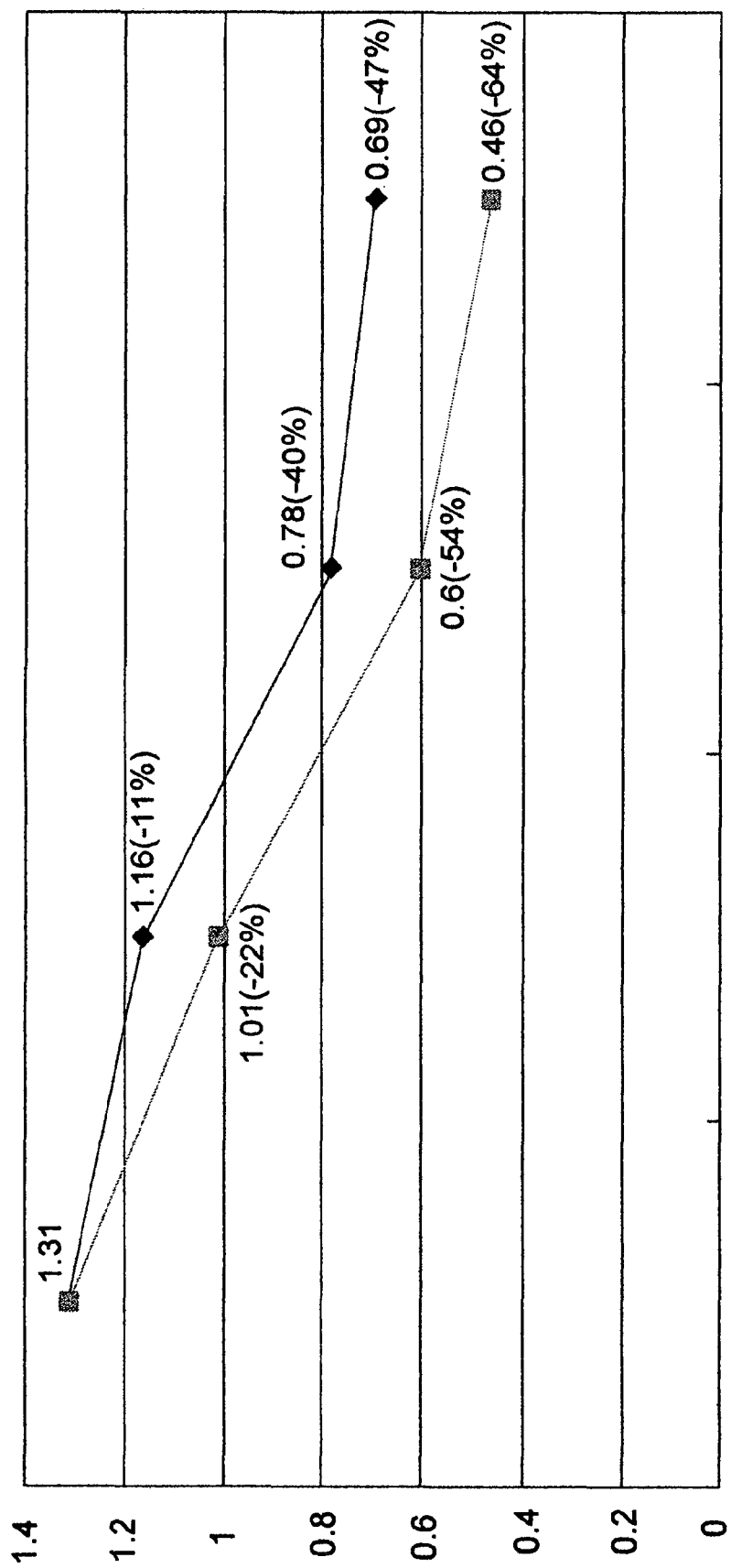
FIG. 14 is a performance analysis graph of a preferred embodiment of the present invention.

Analysis of FIG. 14 indicates that when the main arithmetic unit has a longer operating time than the secondary arithmetic unit, the present invention has made a greater improvement (even up to 64.88%) in the operating speed.

The invention being thus described in terms of MPEG algorithm, it will be obvious that the same may be varied in many ways. For any data operations, if the operating time of any arithmetic module is more than double than that of other modules, improvement can be made by applying the merits of the present invention.

In summary, the present invention provides a module for generating real-time multiple-resolution video streams and the architecture thereof. The present invention has overcome the drawbacks of the prior art as follows:

(1) The present invention has simplified the hardware architecture of the prior art. No internal share memory is used during the operations of the present invention, thereby saving hardware costs and the yield rate during semiconductor fabrication;
(2) By using an external memory, the present invention provides a module capable of synchronously operating a less time-consuming arithmetic module and a more time-consuming arithmetic module, thereby reducing idle time and increasing hardware utilization;
(3) The present invention reduces the usage of the more time-consuming module in order to speed up data processing;
(4) The modules and the parallel operation process of the present invention can greatly increase the operating speed. When the operating time of the main arithmetic unit is longer than that of the secondary arithmetic unit, more significant improvement (even up to 64.88%) in the operating speed is made, thereby making the present invention progressive and industrially applicable; and (5) Via the above (1)~(4), the architecture disclosed in the present invention can process the source of multiple-channel video data and transmit real-time, multiple-resolution video streams to a remote receiver via a network system.

In summary, the above (1)~(4) prove that the present invention can effectively overcome the drawbacks of the prior art. Consequently, the present invention can greatly increase hardware operating time with even lower hardware costs, thereby substantiating the claim of non-obviousness for the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A module for generating real-time, multiple-resolution video streams, for video processing, comprising:
   a system bus;
   an external memory, coupled to said system bus; and
   a main processor, further comprising:
   a microprocessor, coupled to said system bus;
   a main arithmetic unit, coupled to said system bus; and
   a secondary arithmetic unit, coupled to said system bus;
   wherein, when processing n video data, said module performs a parallel operation process, comprising the steps:
   (a) Sampling an nth video data down by m times to generate corresponding k down-sampled video data, where m is a positive real number and k is a positive integer;
   (b) Outputting a down-sampled video data of said nth video data by said external memory to said main arithmetic unit to generate D(n) data, which is stored in said external memory, wherein D(n) is said nth video data, where n is a positive integer;
   (c) After performing a information refining process, said external memory inputs said nth video data and a target data corresponding to said data D(n) to said secondary arithmetic unit so as to process corresponding data, and instantly causing an n−1th video data to perform corresponding Steps (a) and (b); and
   (d) Individually providing the remaining k−1 down-sampled video data with corresponding target data via said data D(n); via said nth video data and target data corresponding to said k−1 down-sampled video data, performing corresponding data operations by said secondary arithmetic unit so as to generate said k−1 resolution video streams, which are stored in said external memory, then instantly causing said n−1th video data to perform corresponding Steps (c) and (d) correspondingly;
   via said Steps (a)~(d), n video data generate corresponding real-time multiple-resolution video streams.

2. The module for generating real-time, multiple-resolution video streams as claimed in claim 1, wherein m is 1 or ¼ or ¹⁄₁₆.

3. The module for generating real-time, multiple-resolution video streams as claimed in claim 1, wherein said module is coupled to a plurality of video devices, which output corresponding video data to said module within a time interval.

4. The module for generating real-time, multiple-resolution video streams as claimed in claim 1, wherein said information refining process is if m=1, said data D(n) is reduced into said target data by 1/Q times in order to perform corresponding steps, where Q is a positive integer; by continuously changing Q values and performing corresponding operations using said secondary arithmetic unit, said multiple-resolution video streams are obtained in real time.

5. The module for generating real-time, multiple-resolution video streams as claimed in claim 1, wherein said information refining process is if m=1/P, said data D(n) is increased into said target data by Q times in order to perform corresponding steps, where P and Q are positive integers; by continuously changing Q values and performing corresponding operations using said secondary arithmetic unit, said multiple-resolution video streams are obtained in real time.

6. The module for generating real-time, multiple-resolution video streams as claimed in claim 1, wherein said information refining process is if m=1/P, said data D(n) is reduced into said target data by 1/Q times in order to perform corresponding steps, where P and Q are positive integers; by continuously changing Q values and performing corresponding operations using said secondary arithmetic unit, said multiple-resolution video streams are obtained in real time.

7. The module for generating real-time, multiple-resolution video streams as claimed in claim 1, wherein said data D(n) is a motion vector data.

8. The module for generating real-time, multiple-resolution video streams as claimed in claim 1, wherein the time required for said main arithmetic unit to process said nth video data is longer than that of said secondary arithmetic unit by y times, where $1<y<10$.

9. The module for generating real-time, multiple-resolution video streams as claimed in claim 1, wherein said main arithmetic unit is a motion estimator for motion estimation.

10. The module for generating real-time, multiple-resolution video streams as claimed in claim 1, wherein said secondary arithmetic unit is a block-encoding unit, comprising:
    a motion-difference unit, coupled to said main arithmetic unit;
    a discrete cosine transform (DCT), coupled to said motion-difference unit;
    a quantization unit, coupled to said discrete cosine transform (DCT);
    a variable length code (VLC), coupled to said quantization unit;
    an inverse-quantization unit, coupled to said variable length code (VLC) and said quantization unit;
    an inverse discrete cosine transform (inverse DCT), coupled to said inverse-quantization unit; and
    a motion-compensation unit coupled to said inverse discrete cosine transform (inverse DCT).

11. The module for generating real-time, multiple-resolution video streams as claimed in claim 1, wherein said module further comprises a video-capture unit, which is coupled to at least one video device for video data capture.

12. The module for generating real-time, multiple-resolution video streams as claimed in claim 1, wherein said module further comprises a network-bridging unit for connecting to a network server.

13. An architecture for generating real-time, multiple-resolution video streams, for use in multiple-channel image processing; comprising:
    a plurality of video devices, for capturing n video data;
    a video-processing module, coupled to said video devices and inputting said nth video data to perform a parallel operation process in order to output the multiple-resolution video streams corresponding to each video data in real time; said module further comprising:
    a system bus;

an external memory, coupled to said system bus; and
a main processor, further comprising:
a microprocessor, coupled to said system bus;
a main arithmetic unit, coupled to said system bus; and
a secondary arithmetic unit, coupled to said system bus;
a first network server, coupled to said video-processing module and a network system, and outputting said video streams via a first communication protocol after inputting image data;
a second network server, coupled to said network system and a plurality of receivers, and inputting said image data and outputting said video streams to said receivers via a second communication protocol;
wherein, when processing n video data, said module performs a parallel operation process, comprising the steps:
(a) Sampling an nth video data down by m times to generate corresponding k down-sampled video data, where m is a positive real number and k is a positive integer, and m and k have one-to-one relationship;
(b) Outputting a down-sampled video data of said nth video data by said external memory to said main arithmetic unit to generate D(n) data, which is stored in said external memory, wherein D(n) is said nth video data, where n is a positive integer;
(c) After said module has performed a information refining process, said external memory inputs said nth video data and a target data corresponding to said data D(n) to said secondary arithmetic unit so as to process corresponding data, and instantly causing an n−1th video data to perform corresponding Steps (a) and (b) correspondingly in real time; and
(d) Individually providing the remaining k−1 down-sampled video data with corresponding target data via said data D(n); via said nth video data and a target data corresponding to said k−1 down-sampled video data, performing said corresponding data operations by said secondary arithmetic unit to generate said k−1 resolution video streams, which are stored in said external memory, then instantly causing said n−1th video data to perform corresponding Steps (c) and (d);
Via said Steps (a)~(d), n video data generate corresponding multiple-resolution video streams in real time.

14. The architecture for generating real-time, multiple-resolution video streams as claimed in claim 13, wherein said video devices are a plurality of webcams.

15. The architecture for generating real-time, multiple-resolution video streams as claimed in claim 13, wherein said receiver is a personal computer.

16. The architecture for generating real-time, multiple-resolution video streams as claimed in claim 13, wherein said receiver is a database.

17. The architecture for generating real-time, multiple-resolution video streams as claimed in claim 13, wherein said receiver is a personal digital assistant (PDA).

18. The architecture for generating real-time, multiple-resolution video streams as claimed in claim 13, wherein said receiver is a mobile phone.

19. The architecture for generating real-time, multiple-resolution video streams as claimed in claim 13, wherein m is 1 or ¼ or 1/16.

20. The architecture for generating real-time, multiple-resolution video streams as claimed in claim 13, wherein said architecture is coupled to a plurality of video devices, which output corresponding video data to said architecture within a certain time interval.

21. The architecture for generating real-time, multiple-resolution video streams as claimed in claim 13, wherein said information refining process is if m=1, said data D (n) is reduced into said target data by 1/Q times in order to perform corresponding steps, where Q is a positive integer; by continuously changing Q values and performing corresponding operations using said secondary arithmetic unit, said multiple-resolution video streams are obtained in real time.

22. The architecture for generating real-time, multiple-resolution video streams as claimed in claim 13, wherein said information refining process is if m=1/P, said data D (n) is increased into said target data by Q times in order to perform corresponding steps, where P and Q are positive integers; by continuously changing Q values and performing corresponding operations using said secondary arithmetic unit, said multiple-resolution video streams are obtained in real time.

23. The architecture for generating real-time, multiple-resolution video streams as claimed in claim 13, wherein said information refining process is if m=1/P, said data D (n) is reduced into said target data by 1/Q times in order to perform corresponding steps, where P and Q are positive integers; by continuously changing Q values and performing corresponding operations using said secondary arithmetic unit, said multiple-resolution video streams are obtained in real time.

24. The architecture for generating real-time, multiple-resolution video streams as claimed in claim 13, wherein said data D (n) is a motion vector data.

25. The architecture for generating real-time, multiple-resolution video streams as claimed in claim 13, wherein the time required for said main arithmetic unit to process said nth video data is longer than that of said secondary arithmetic unit by y times, where 1<y<10.

26. The architecture for generating real-time, multiple-resolution video streams as claimed in claim 13, wherein said main arithmetic unit is a motion estimator for motion estimation.

27. The architecture for generating real-time, multiple-resolution video streams as claimed in claim 13, wherein said secondary arithmetic unit is a block-encoding unit, comprising:
A motion-difference unit, coupled to say main arithmetic unit;
a discrete cosine transform (DCT), coupled to said motion-difference unit;
a quantization unit, coupled to said discrete cosine transform (DCT);
a variable length code (VLC), coupled to said quantization unit;
an inverse-quantization unit, coupled to said variable length code (VLC) and said quantization unit;
an inverse discrete cosine transform (inverse DCT), coupled to said inverse-quantization unit; and
a motion-compensation unit, coupled to said inverse discrete cosine transform (inverse DCT).

28. The architecture for generating real-time, multiple-resolution video streams as claimed in claim 13, wherein said architecture further comprises a video-capture unit, which is coupled to at least one video device for video data capture.

29. The architecture for generating real-time, multiple-resolution video streams as claimed in claim 13, wherein said architecture further comprises a network-bridging unit for connecting to a network server.

* * * * *